(12) United States Patent
Charles Albert

(10) Patent No.: US 8,092,646 B2
(45) Date of Patent: Jan. 10, 2012

(54) METHOD AND APPARATUS FOR THERMOCAPILLARY EVAPORATION

(76) Inventor: Ward Charles Albert, Toronto (CA)

( * ) Notice: Subject to any disclaimer, the term of this patent is extended or adjusted under 35 U.S.C. 154(b) by 318 days.

(21) Appl. No.: 11/574,094

(22) PCT Filed: Aug. 31, 2006

(86) PCT No.: PCT/CA2006/001425
§ 371 (c)(1), (2), (4) Date: Feb. 22, 2007

(87) PCT Pub. No.: WO2007/025379
PCT Pub. Date: Mar. 8, 2007

(65) Prior Publication Data
US 2009/0032467 A1 Feb. 5, 2009

Related U.S. Application Data

(60) Provisional application No. 60/712,437, filed on Aug. 31, 2005.

(51) Int. Cl.
*B01D 1/00* (2006.01)
*B01D 1/30* (2006.01)
*B01D 3/10* (2006.01)
*B01D 3/42* (2006.01)

(52) U.S. Cl. ........ 159/47.1; 159/16.1; 159/44; 159/903; 159/DIG. 15; 159/DIG. 16; 202/205; 202/234; 202/267.1; 203/1; 203/49; 203/86; 203/DIG. 1

(58) Field of Classification Search .......... 159/16.1, 159/44, 47.1, 903, 906, DIG. 1, DIG. 15, 159/DIG. 16; 202/205, 234, 267.1; 203/1, 203/10, 49, 86, DIG. 1, DIG. 13
See application file for complete search history.

(56) References Cited

U.S. PATENT DOCUMENTS

| | | | |
|---|---|---|---|
| 4,494,595 A * | 1/1985 | Schmid | 165/274 |
| 4,534,828 A | 8/1985 | Erickson et al. | |
| 7,003,215 B2 * | 2/2006 | Gelernt et al. | 392/399 |
| 2002/0150683 A1 * | 10/2002 | Troian et al. | 427/256 |
| 2006/0246224 A1 * | 11/2006 | Neitzel | 427/372.2 |

OTHER PUBLICATIONS

C. A. Ward; Fei Duan "Turbulent transition of thermocapillary flow induced by water evaporation", Physical Review E, 2004, 69, 056308.
S. Popov, A. Melling, F. Durst, C. A. Ward, "Apparatus for investigation of evaporation at free liquid vapour interfaces" International Journal Heat Mass Transfer, 2005, 48, 2299.
G. Fang and C. A. Ward, "Temperature measured close to the interface of an evaporating liquid", Physical Review E, 1999, 59, 417.
C. A. Ward and G. Fang, "Expression for predicting liquid evaporation flux: Statistical rate theory approach", Physical Review E, 1999, 59, 429.
G. Fang and Ci A. Ward "Examination of the statistical rate theory expression for liquid evaporation rates" Physical Review E, 1999, 59, 441.

(Continued)

*Primary Examiner* — Virginia Manoharan
(74) *Attorney, Agent, or Firm* — Brion Raffoul

(57) ABSTRACT

A vaporization apparatus and related vaporization method is provided that relies on thermocapillary convection. The apparatus of a thermocapillary evaporator has three sections: an evaporation section, a displacement section, and a storage system for storing the liquid to be evaporated. The evaporation section is operable to distribute thermal energy substantially along the entire liquid-gas interface. The method of the present invention includes providing a thermocapillary evaporator. Advantageously, the present invention provides substantial evaporation from relatively low temperature heat sources, compared to conventional evaporators.

15 Claims, 7 Drawing Sheets

OTHER PUBLICATIONS

C. A. Ward and D. Stanga, "Interfacial conditions during evaporation or condensation of water", Physical Review E, 2001, 64, 051509.

H. K. Cammenga, D. Schreiber, G. T. Barnes, and D. S. Hunter, *J. Colloid Interface Sci.* 98, 585, 1984.

An-Ti Chai and Nengli Zhang, "Experimental study of Marangoni-Benard Convection in a liquid layer induced by evaporation" *Experimental Heat Transfer* 1998, 11,187.

Minton, P.E., Handbook of Evaporation Technolgy, Noyes Publications, Westood, NJ, USA, 1986, pp. 74-76.

* cited by examiner

METHOD AND APPARATUS FOR THERMOCAPILLARY EVAPORATION

CONTINUITY DATA

This patent application is a National stage of PCT/CA2006/001425, filed Aug. 31, 2006, now expired, which claims the benefit of U.S. Patent Application 60/712,437, filed Aug. 31, 2005, now expired.

FIELD OF THE INVENTION

This invention relates generally to evaporators. This invention also relates generally to vaporisation methods.

BACKGROUND OF THE INVENTION

Conventional evaporators are well known. Typically they utilize thermal conduction and buoyancy-driven convection to transfer thermal energy from heating elements to the liquid-vapour (or gas) interface where the liquid is converted to vapour. The heating element is immersed in the liquid phase below the interface. The efficiency of such conventional evaporators, in terms of their rate of evaporation relative to the temperature of the heating source is less than optimal: when the heating element is immersed in the liquid, there is a temperature decrease of the liquid between the position where the heating element is placed and the liquid-vapour interface where the vaporisation process takes place. The deeper the heating element is placed below the interface, the larger the temperature decrease and the less effective the conventional evaporator design is for a given heat-source temperature at producing vapour. The amount of energy required to change a liquid phase to vapour is known (for water, for example, at 25° C. it is 2305 kJ/kg).

Thermocapillary convection is generally known as a mode of fluid transport at a liquid-vapour interface in which the fluid is transported in the direction of increasing surface tension. The surface tension generally decreases as the temperature is increased. Thus, imposing a temperature gradient along an interface can generate thermocapillary convection. Although the presence of thermocapillary flow has been well documented for liquids other than water, those skilled in the art previously believed that thermocapillary convection did not exist for water (see H. K. Cammenga, D. Schreiber, G. T. Barnes, and D. S. Hunter, *J. Colloid Interface Sci.* 98, 585, 1984). It is also known that thermocapillary convection is present during water evaporation.

The conventional view has been that only negligible thermal energy is transported by thermocapillary convection because the surface phase is so thin. However, it has been discovered that when water evaporates while maintained at the mouth of a stainless steel funnel, up to 40% of the thermal energy required to sustain the evaporation process in steady state was transported by thermocapillary convection.

The contribution of thermocapillary convection is not optimized when evaporation takes place at the mouth of a funnel. Since evaporation is such an important industrial process and needs to take place with the highest efficiency possible, there is a need, for a given heating source temperature, for methods that maximize the amount of vapor produced per unit time and per unit liquid-gas interfacial area (i.e. the evaporation flux). There is also a need for an evaporator design that greatly improves the evaporation flux compared to the conventional design concepts of evaporators. There is a further need for an evaporator that utilizes thermocapillary convection.

SUMMARY OF THE INVENTION

A vaporization apparatus and related vaporization method is provided that relies on thermocapillary convection.

The apparatus consists of a thermocapillary evaporator that has three sections: an evaporation section, a displacement section, and a storage system for storing the liquid to be evaporated. According to particular embodiments of the present invention, the displacement section can be a blower or vacuum section. The storage system is equipped with a pump to maintain the liquid in the evaporator section at the level of the heating elements as the liquid flows through the evaporator section. In a particular embodiment of the present invention, the liquid defines in the evaporator section a surface area; the surface area in turn defines a liquid-gas interface.

The evaporation section of the present invention is operable to deliver energy to the liquid-gas interface by means of thermocapillary convection. In particular, the evaporation section is operable to distribute thermal energy substantially along the entire liquid-gas interface. To this end, the evaporator section or sections each consist of one or more heating element. Each heating element is located at the liquid-gas interface, and oriented so it is parallel to the surface formed by the liquid-gas interface. The storage system is operable to maintain the liquid in the evaporator section or sections at a level defined when the heating elements are in contact with the liquid-gas interface. The thermocapillary evaporator of the present invention enhances the evaporation flux, and provides an evaporator with improved performance. The displacement section cooperates with the evaporation section to displace the vapour from the evaporation section.

The method of the present invention consists of providing a thermocapillary evaporator that includes a storage system for the liquid to be evaporated. This storage system is capable of pumping liquid into the evaporator section at a controlled rate. The pumping rate does not completely fill the evaporator section with liquid, but forms a liquid-gas interface in the evaporator section at the height of the heating elements. These heating elements are parallel to the liquid-gas interface, and can be heated in any number of ways, including as described below.

The present invention also provides an apparatus and related methods for evaporation at relatively low temperature, liquid purification, and liquid reclamation.

The present invention provides substantial evaporation from relatively low temperature heat sources, compared to conventional evaporators. As a result this makes it possible to construct this evaporator from plastic. Such construction makes this evaporator resistant to corrosion, and allows it to be applied for liquid purification, and reclamation of liquid components from liquid mixtures. The plastic used can be of sufficiently high grade so that the evaporator can be used to prepare foods for human or animal consumption.

BRIEF DESCRIPTION OF THE DRAWINGS

A detailed description of the preferred embodiment(s) is (are) provided herein below by way of example only and with reference to the following drawings, in which.

Figure 1:
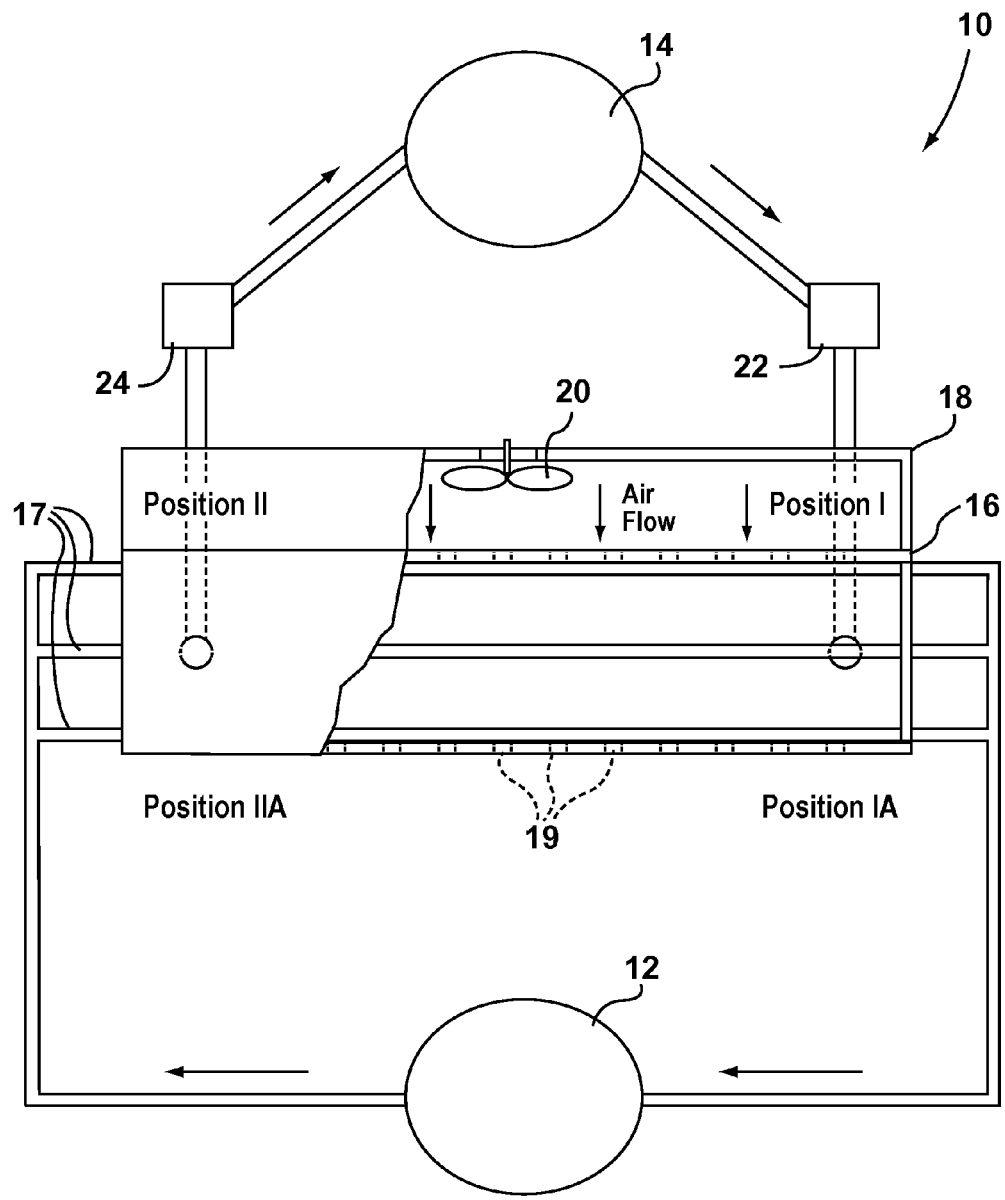
FIG. 1 is a system schematic of a thermocapillary evaporator in accordance with an embodiment of the present invention.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE INVENTION

Shown in FIG. 1 is a system top-view schematic of a thermocapillary evaporator (10), a heat source (12), and a storage system or container (14) for the liquid to be evaporated. The thermocapillary evaporator (10) includes an evaporator section (16) that includes a plurality of heating elements (17). The heating elements (17) and their arrangement are further described below. The heating elements (17) generally consist of conventional heating elements, and in one particular embodiment thereof (and which was used in the experiments described below), the heating elements (17) consists of conventional copper heating tubes. A pump (not shown) is attached to the storage system (14) to circulate the liquid to be evaporated through the evaporator section (16) of the thermocapillary evaporator. Optionally, an in flow meter (22) and an out flow meter (24) are used to monitor the rate at which liquid enters and exits the evaporator section (16).

The heat source (12) can consist of several different apparati, depending on a number of factors including the specific liquid to be evaporated. In the particular example shown the heat source (12) consists of a thermostated oil bath in which the oil in the bath is maintained at a pre-selected temperature and the heated oil is circulated through the tubes of the evaporator section. Other examples include electrical heating elements that could be enclosed in tubes to ensure they do not short circuit.

According to one particular embodiment of the present invention, the thermocapillary evaporator (10) also includes a displacement means that is a blower section (18). The blower section (18) may include a fan (20) of appropriate design plus a suitably designed section to ensure the air leaving the fan (20) is directed into the evaporator in a direction that is perpendicular to the direction of the flow of the liquid in the evaporator, and above, but near the liquid-gas interface.

As shown in FIG. 1, one vertical wall of the evaporator section (16) that is shared with the blower section (18), in a particular embodiment of the present invention, has holes (19) above the heating elements (17) of the evaporator section (16). A fan (20), mounted in the blower section (18), forces the air-vapour mixture across the evaporator section (16), and out through the holes (19) in an outer wall of the evaporator section (16). This vapour could also be collected and circulated to a condenser to obtain a purified form of the liquid or to separate more volatile components of a liquid mixture (see below).

Figure 2:
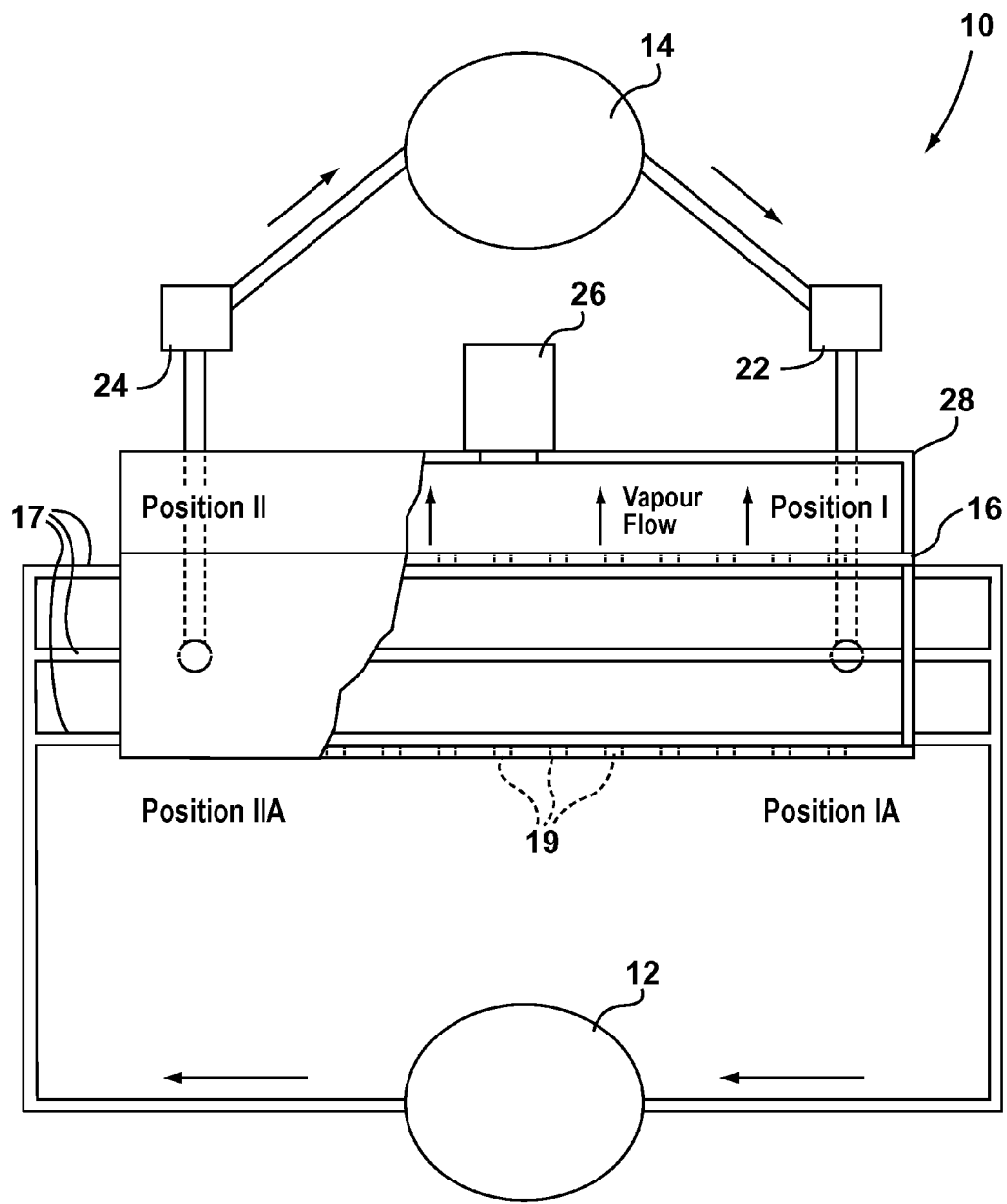
FIG. 2 is a system schematic of a thermocapillary evaporator in accordance with an embodiment of the present invention.

As indicated in FIG. 2, according to another embodiment of the present invention, the blower section (18) may be replaced with a vacuum section (28), the vacuum section (28) including a vacuum device (26) with the other components remaining essentially the same. One vertical wall of the evaporator section (16) that is shared with the vacuum section (28) has holes (19) above the heating elements (17) of the evaporator section (16). The vapour is then pulled into a container (not shown) where the vapour may be further processed.

It should be understood that the displacement means, being either a blower section (18) or the vacuum section (28), for example, provide a means of displacing the vapour created by operation of the thermocapillary evaporator. Persons skilled in the art would recognize other configurations or embodiments for achieving this result.

In the design of the thermocapillary evaporator (10), the depth of the liquid, as it passes through the evaporator section (16), is maintained so the liquid-gas interface is in contact with the heating elements (17) throughout the evaporator section (16), as particularized below. This design is compared with the conventional evaporator design below. According to one embodiment, the thermocapillary evaporator (10) is divided into two principal sections: (i) the blower section (18); and (ii) the evaporator section (16).

In the design of the thermocapillary evaporator (10), the level of the liquid-vapour interface is preferably maintained at substantially the same depth as the heating elements (17), and thermocapillary convection is relied on to transport thermal energy along the interface to evaporate the liquid. In other words, the heating elements (17) are so disposed that they are in contact with the liquid-gas interface of the volume of liquid in the evaporator section (16). Furthermore, in a particular aspect of the present invention, the heating elements (17) are generally distributed over the surface of the volume of liquid in the evaporator section (16) to provide more efficient evaporation.

Figure 3:
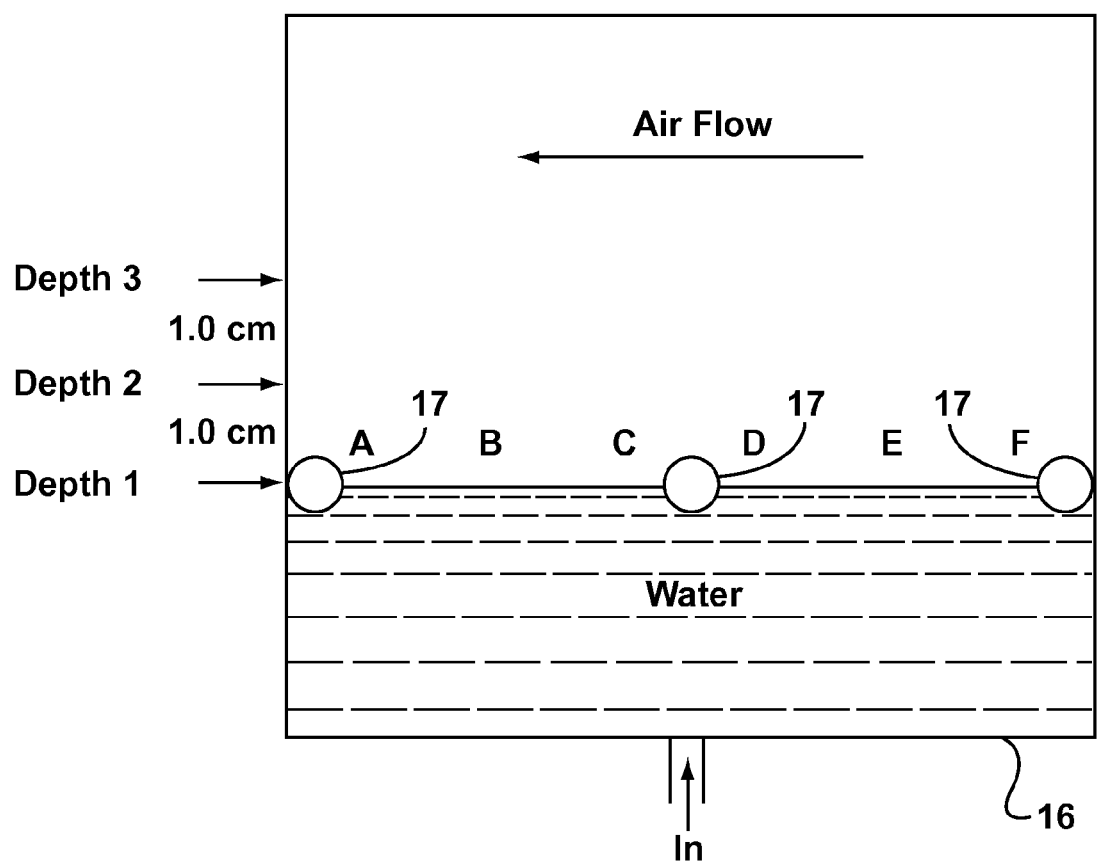
FIG. 3 illustrates a cross-sectional view of the evaporator section of a thermocapillary evaporator.

It should be understood that, in accordance with the present invention, the water level is preferably maintained at Depth 1, as shown in FIG. 3. Depth 2 is 1.0 cm above Depth 1, and Depth 3 is 2.0 cm above Depth 1, as examples. At these other depths, the system is operating as a conventional evaporator.

One means of maintaining the liquid at such a level is through use of a flow controller. A known flow controller can be employed such that some of the liquid evaporates as it is pumped through the evaporator section (16) and is removed from that section by the blower section (18) or the vacuum section (28), and the portion of the liquid that does not evaporate is returned to the storage system (14) where it can be pumped through the evaporator section (16) again, and another portion of the liquid evaporated. The flow controller maintains the liquid in contact with the heating elements. More particularly, the flow controller can be provided with means for detecting the level of the liquid in the evaporator section (16), and if it falls below a certain value (determined with maintenance of contact between the liquid and the heating elements in mind), the flow controller corrects the level via a further means for adjusting the pumping rate accordingly.

Comparison of Evaporation Rates Achieved with a
Thermocapillary Evaporator Compared with
Conventional Evaporator Design In a conventional evaporator design, the heating elements are immersed well below the interface, and the temperature of the heating element is raised to whatever value is required to achieve the desired evaporation rate. Thermal energy is transported to the liquid-gas interface by thermal conduction and buoyancy-driven convection. In these conventional designs, the heating elements are generally immersed well below the water-vapour interface, often at varying depths.

The efficiency of the conventional evaporator design versus the design of the present invention has been examined by maintaining the water level at different depths in a system as shown schematically in FIG. 1, and measuring the evaporation rate.

Figure 4:
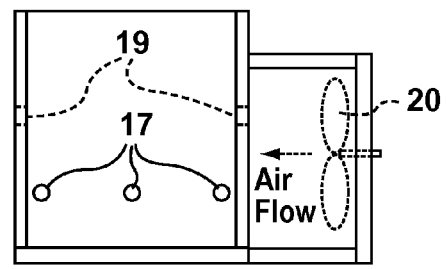
FIGS. 4, 5 and 6 illustrate a side view, end view and top view, respectively, of a thermocapillary evaporator.
Figure 5:
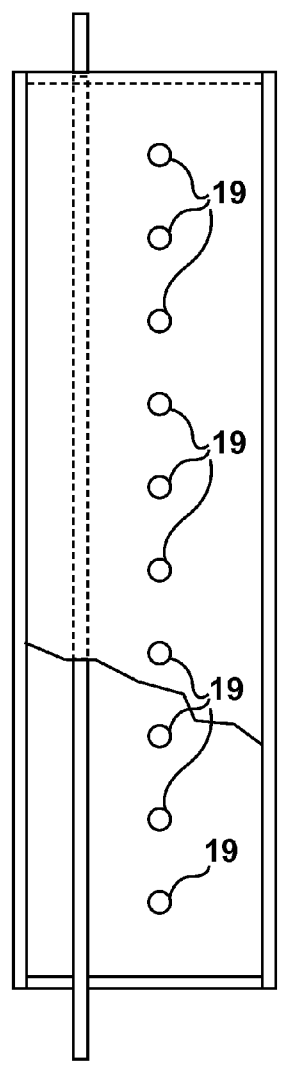
Figure 6:
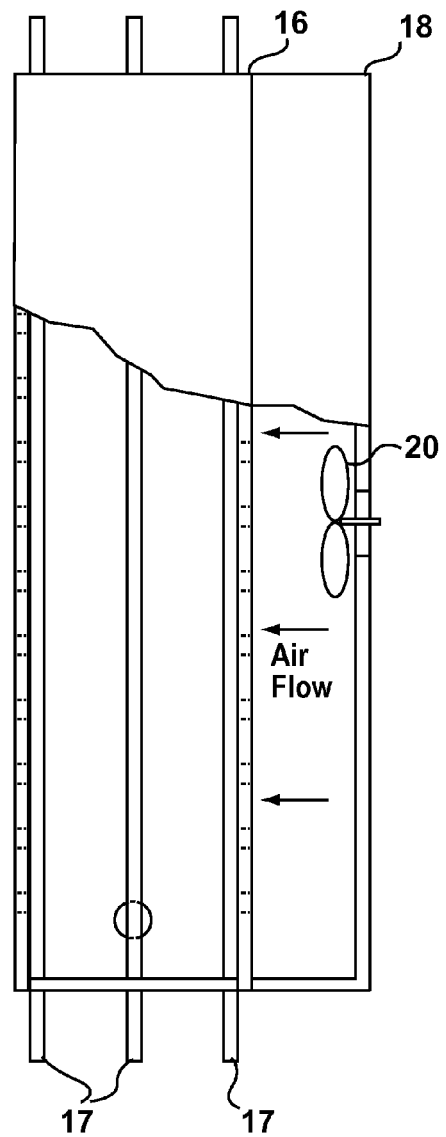

In an example, an evaporator section (16) was constructed using polycarbonate sheet material having a thickness of 12 mm, along with heating elements (17) consisted of copper piping. This design is illustrated in FIG. 4, FIG. 5 and FIG. 6. The evaporator section (16) was constructed to a size of about 114×90×353 mm (height, width, length). The heating elements (17) were located about 20 mm above and substantially parallel to the bottom of the evaporator section (16), with an outer diameter of about 6mm and an inner diameter of about 4 mm. The holes (19) were positioned about 50 mm above the bottom of the evaporator section, spaced apart by about 29 mm across the length of the evaporator section (16), and having a diameter of 10 mm. The temperature of the oil bath (i.e. the heating source) was maintained at 68° C., the blower section (18) was maintained at a constant speed, and the thermostated oil was circulated through the heating elements (17) at the same rate; thus, the potential heating was the same in each experiment.

The depth of the water in the evaporator was maintained constant at one of three depths described below, and as shown in FIG. 3. The first depth was the same as that of the heating elements (i.e., the copper tubes): evaporation under this condition would correspond to the thermocapillary design, in accordance with the present invention. A second depth considered was one centimeter above the copper tubes, and the third was two centimeters above. The experiments were conducted under steady-state conditions with water at one of the three depths considered, and the rate at which water entered and exited the evaporator monitored with the calibrated flow meters (22, 24) indicated in FIG. 1. Measurements with the flow meters were used to determine the net evaporation rate.

A thermocouple system was used to measure the temperature of the water at the interface at each of the positions indicated as "A, B . . . F" shown in FIG. 3. The values recorded are listed in Table 1 below. Most importantly, note the average evaporation flux: when the evaporator was operated in the thermocapillary mode, the evaporation rate was about 3.5 times greater than when the water depth was one centimeter above the copper tubes, and about 5.4 times larger than when the water level was maintained two centimeters above the heating elements. The measured interfacial liquid temperatures provide an explanation for the much higher evaporation rate when the system of the present invention is operated in the thermocapillary evaporator mode. Note that at all positions they are higher in the thermocapillary mode of the present invention than when the evaporator was operated in the conventional modes. Thus, the thermocapillary mode is more effective at heating the liquid at the interface and this gives rise to a higher rate of evaporation. The deeper the heating elements (17) are immersed in the liquid phase, the less effective it is at producing vapour.

TABLE 1

Measured Interfacial-Liquid Temperatures and Evaporation Flux

| Experiment: | Depth 1 | Depth 2 | Depth 3 |
|---|---|---|---|
| Temp. (° C.) at A | 37.4 | 33.9 | 33.7 |
| Temp. (° C.) at B | 34.3 | 33.2 | 33.5 |
| Temp. (° C.) at C | 37.6 | 33.5 | 33.6 |
| Temp. (° C.) at D | 37.7 | 33.6 | 33.7 |
| Temp. (° C.) at E | 34.3 | 33.3 | 33.6 |
| Temp. (° C.) at F | 37.6 | 34.0 | 33.8 |
| Evaporation flux (g/m$^2$s) | 10.2 | 2.9 | 1.9 |

Advantages of the Thermocapillary Evaporator

In addition to being more effective at producing vapour, there are a number of other advantages of the thermocapillary evaporator (10) compared to conventional evaporators.

Significant evaporation rates of water can be achieved while using as a heat source (12) with a temperature well below 100° C. Energy in this temperature range is sometimes called waste-heat because it has a low potential for conversion to power and because it is readily available from many sources. Evaporation using waste-heat as the heat source (12) for evaporation would result in a lower operating cost for the evaporator.

Except for the heating elements (17), due to the relatively low evaporation temperature, the components of the thermocapillary evaporator (10) can be made of plastic. This reduces the cost of the thermocapillary evaporator, and can prolong its operating lifetime, since plastic is less susceptible to "fouling" and corrosion than is stainless steel or another metal. This is particularly important if the evaporator is to be used to purify brackish water or evaporate other corrosive liquids. Also, it is a major advantage in preparing foods, since the proteins of the foods suffer less damage lower relative temperatures.

Separation of Liquid Mixture Components by Volatility

The thermocapillary evaporator (10) can be used to separate the components of a liquid mixture that have different volatilities. To demonstrate this, the separation of water from ethanol when a 50% water-ethanol mixture is circulated through the thermocapillary evaporator (10) has been measured. A connection was made between two positions in the blower section (18) (Positions I and II as illustrated in FIG. 1) and between two positions in the exhaust to the evaporation section (16): (Positions IA and IIA as illustrated in FIG. 1). At each position, a sample of the gas mixture was drawn into a vacuum chamber that was maintained at 4,000 Pa during each measurement. This chamber was then sampled through a leak-valve with a residual-gas-analyzer (RGA) attached to an ultra-high-vacuum (UHV) system. The pressure in the UHV system was adjusted to $2.7 \times 10^{-4}$ Pa, and maintained at this value during all RGA measurements (using Stanford Research Systems, Inc., model no. RGA 200).

If the total pressure measured by the RGA is denoted as P, the sensitivity of the RGA at the mass number used to identify a particular component by $f_i$, and the partial pressure of component i as $p_i$, then the mole fraction of a component in a gas sample may be expressed as:

$$x_i = \frac{p_i}{Pf_i}$$

Figure 7:
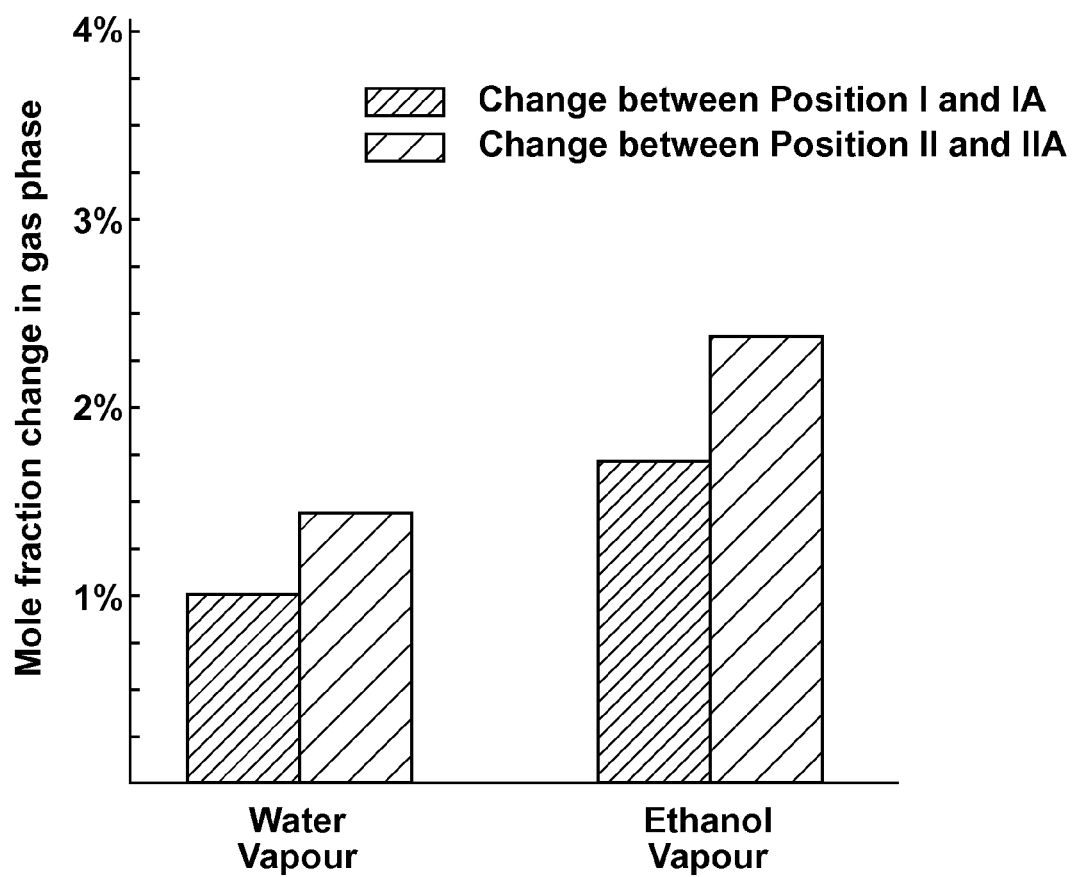
FIG. 7 is a graph illustrating the change in the mole fraction of water and of ethanol in the gas stream as the gas stream crosses the thermocapillary evaporator.

As seen in FIG. 7, the measurement of the change in the mole fraction of water in the gas stream as the stream crossed the thermocapillary evaporator (10) was found to be approximately 1% at Position I and to be ~1.5% at Position II. This difference in the mole fractions at Positions I and II reflects the approximately 5° C. difference in temperature between these two positions. This measurement indicates that water is being removed from the 50/50 mixture as the mixture passes through the thermocapillary evaporator (10).

An even larger difference was observed in the mole fraction of ethanol between the blower-side and the exit side of the thermocapillary evaporator (10). Between Position I and IA, the mole fraction increase was 1.6% and between Position II and IIA, it was 2.4%. Note that a larger percentage of the ethanol was removed from the 50% mixture of water and ethanol at each location. Thus, the thermocapillary evaporator (10) can be used to purify a liquid mixture, and since it is the more volatile component that is preferentially removed, the thermocapillary evaporator (10) could also be used to reclaim certain liquids. For example, in many circumstances it is desirable to reclaim glycol from water-glycol mixtures. In this case, it would be water that is preferentially removed because of its higher volatility.

Colloid Suspension Example

One illustrative application of the thermocapillary evaporation concept is in removing the water from colloid suspensions that are the by-product of ethanol production. In one version of ethanol production, corn undergoes a fermentation process, and then ethanol is separated from the fermentation product by a standard distillation process, leaving an aqueous suspension of corn colloids that is~4% solids. This suspension is referred to as "thin-stillage". The solids in this suspension are a valuable food product for animals, but the suspension must be concentrated by evaporation to bring the concentration to~40% (kg solids per kg solution).

One of the known procedures for performing this evaporation is the so-called "multiple feed" evaporation. However, this method is known to produce significant waste-heat.

Figure 10:
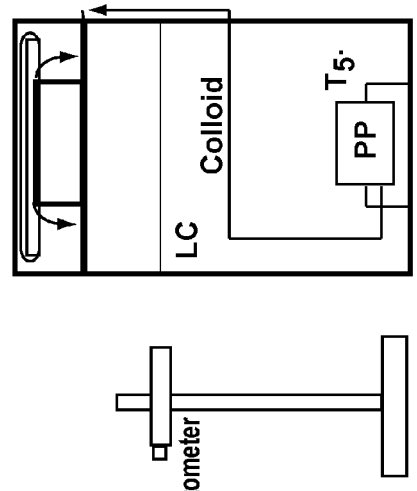
FIGS. 8, 9 and 10 schematically illustrate a top view, front view and right side view, respectively, of a thermocapillary evaporator used to evaporate water from an aqueous corn-colloid suspension.
Figure 8:
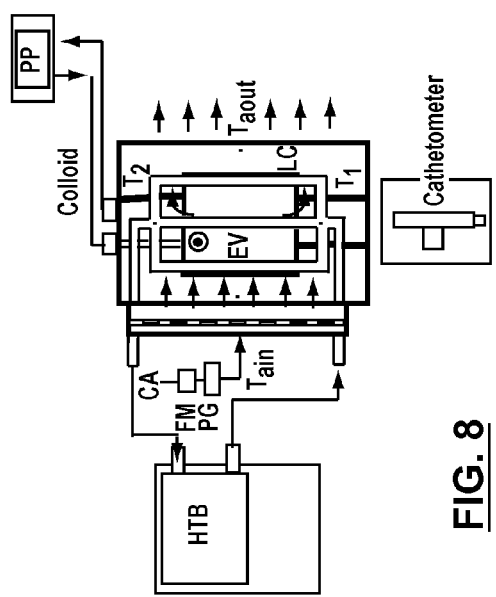
Figure 9:
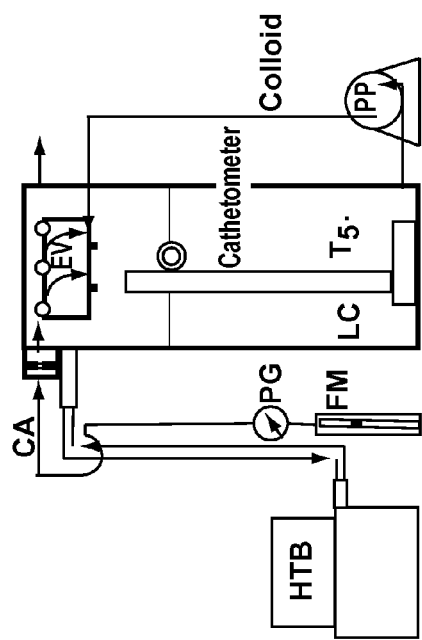

To estimate the additional thin-stillage that could be processed with waste-heat using a thermocapillary evaporator, a series of experiments with thin-stillage was performed with the thermocapillary evaporator that is shown schematically in FIG. 8, FIG. 9 and FIG. 10. In FIG. 8, FIG. 9 and FIG. 10, the following abbreviations are used: HTB refers to Hot Water Bath; CA refers to Compressed Air; FM refers to Flow Meter; PG refers to Pressure Gauge; EV refers to Evaporation Chamber; PP refers to Piston Pump; and LC refers to Lower Container. Note that these figures are not to scale. From the parameters measured, the amount of thin-stillage that could be processed with the waste heat of a conventional three-stage evaporator was estimated.

In this evaporator, the lower container was designed to have a capacity of 10.5 L. The evaporation chamber had cross section area 74 cm², and a height of 3.9 cm. It consists of three pieces of Cu heating tubes. Each is 0.635 cm in outside diameter spaced (centreline to centreline distance) 3 cm apart. The system was operated so the lower half of the heating elements were immersed in the thin-stillage. When conducting the evaporation experiment, the lower container shown in FIG. 8 was filled with thin-stillage at room temperature. The temperature of the heat bath was set at 70° C. (Note this temperature is much less than the temperature of the waste-heat from the conventional evaporator.) The outlet valve was used to adjust the flow rate of heating fluid. Air was pumped steadily across the interface of the thin-stillage during each experiment. The piston pump transported the liquid feed from the lower container (cross-sectional area 300 cm² and height 35 cm) into the bottom of the evaporation chamber and on to the top of the evaporation chamber where it encountered the heating elements and the cross-flow of air. The evaporation took place at the top of the evaporation chamber. The liquid that did not evaporate overflowed the evaporation chamber, and returned to the chamber below, where it was mixed with the fluid that was there and subsequently pumped through the evaporator again.

Figure 11:
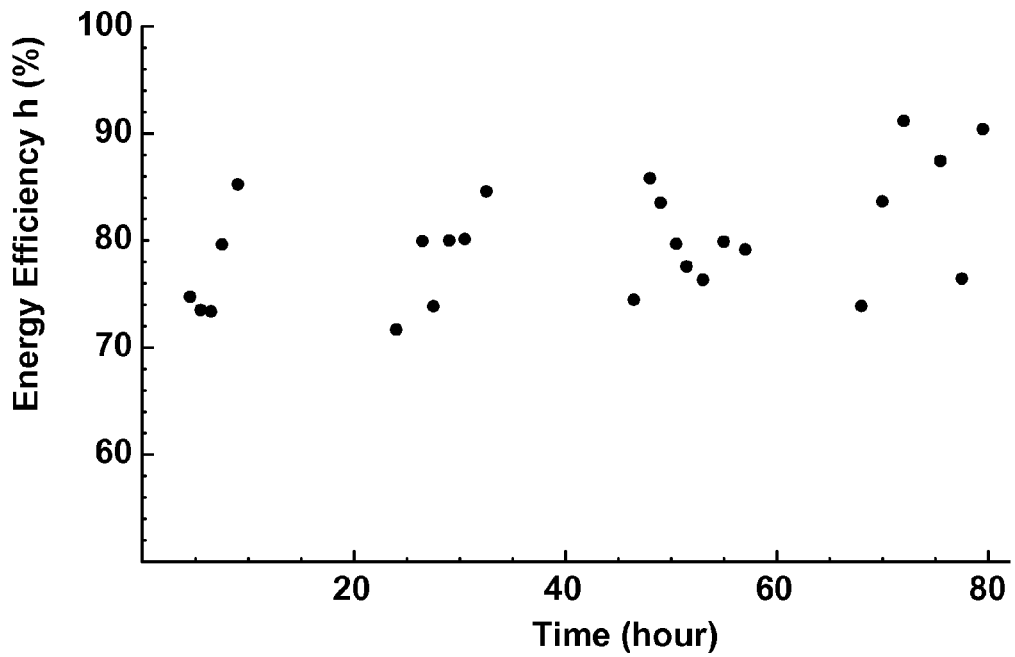
FIG. 11 is a graph illustrating experimental evaporation results, namely the energy efficiency of water evaporation from a colloid suspension.
Figure 12:
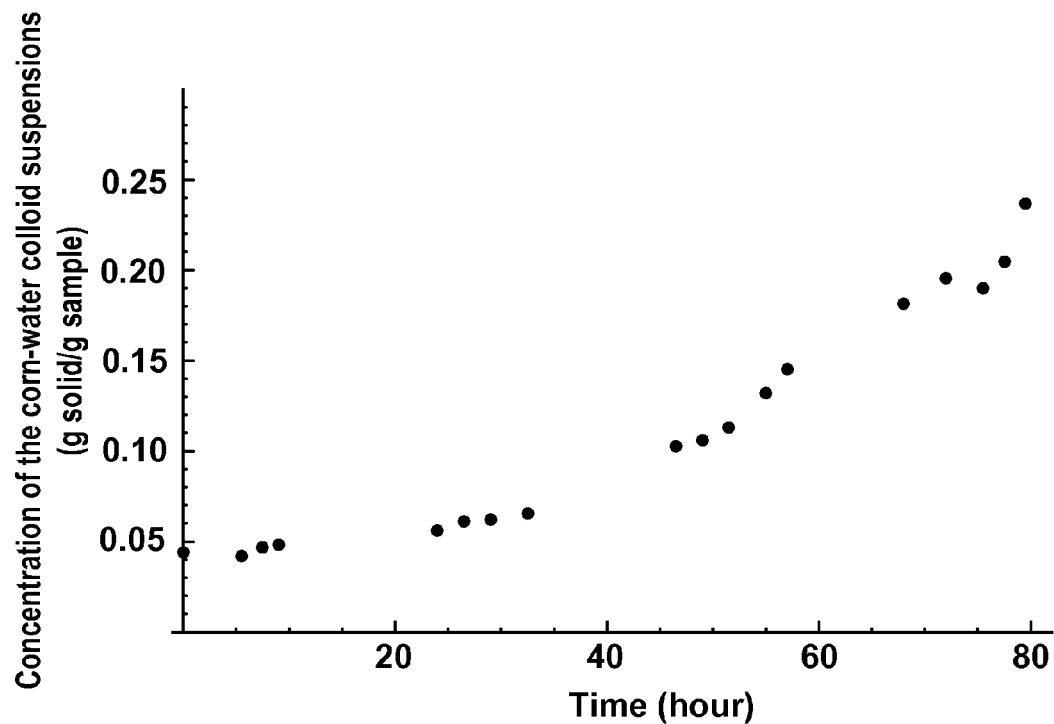
FIG. 12 is a graph illustrating colloid concentration during an evaporation experiment.

The type of results obtained are illustrated in FIGS. 11 and 12. In FIG. 11, the energy efficiency of water evaporation from a colloid suspension is shown. It should be noted that it was between 70 and 90% throughout the experiment. The scatter in the data reflects the accuracy with which the measurements could be made. As the experiment progressed the concentration of the colloid increased, as indicated in FIG. 12.

When the data from these experiments was used to estimate how much additional thin-stillage could be processed if a thermocapillary evaporator were added to a conventional three-stage evaporator, and only the waste-heat from a conventional evaporator were used in the thermocapillary evaporator, it was estimated that an additional 24% could be processed. Since only waste-heat was being used, this additional processing could either be used to reduce the cost of the operation while maintaining the same output from the evaporator or to keep the cost the same while increasing the output.

Total Evaporation Rate

A number of different procedures can be used to obtain large evaporation rates with the thermocapillary evaporator (10) construction and concept. One method is to simply make the surface area of the thermocapillary evaporator (10) larger while keeping the ratio of the liquid-vapour surface area to the surface area of the heating elements (17) constant.

If a large pool of liquid is to be evaporated, one possibility is to construct a raft that floats on the liquid pool, and holds the heating elements (17) (i.e., the tubes through which a hot fluid is to be pumped) at the liquid-gas interface of the pool. Solar heating or any one of several techniques can be used to heat the fluid that is to be pumped through the heating tubes (17). Such a raft, that incorporates the disclosed attributes of the thermocapillary evaporator of the present invention, could be constructed by those skilled in the art.

Other modifications or embodiments of the invention are possible. It should be understood that the present invention provides means for improving the efficiency of evaporation, and known apparati that utilize evaporation can be modified to include the evaporator of the present invention. While a pair of tubes is shown in the drawings that present the heating elements (17) of the present invention, it should be understood that alternate configurations are possible such as a single tube presenting the heating element, provided in a U-shaped configuration, as an example, or in fact tube arrangements in grid type patterns. The present invention therefore has application in areas where phase change is important such as in energy production, heating/cooling systems, and condensators.

What is claimed is:

1. An evaporation apparatus comprising:
   (a) an evaporator means for evaporating a liquid, said liquid defining in the evaporator means a surface area, the surface area defining a liquid-gas interface; and
   (b) a displacement means for displacing vapor created by the evaporator means;
   wherein
   the evaporator means includes at least one heating element disposed to contact the liquid-gas interface and evaporate the liquid by thermocapillary convection
   and wherein
   said evaporation apparatus further comprises a storage system for storing a liquid to be evaporated, the storage system being operable for maintaining said liquid in said evaporator means such that said at least one heating element is in contact with said liquid-gas interface.

2. The evaporator apparatus of claim 1 wherein the storage means comprises at least one flow meter to monitor the flow rate of the liquid.

3. The evaporation apparatus of claim 1 wherein the storage means further comprises a flow controller.

4. The evaporation apparatus of claim 1 wherein the evaporator means comprises holes above the heating elements, the displacement means displacing the vapor out through the holes.

5. The evaporation apparatus of claim 1 wherein the displacement means is a blower section comprising at least one fan.

6. The evaporation apparatus of claim 1 wherein the displacement means is a vacuum section.

7. The evaporation apparatus of claim 1 wherein said at least one heating element is linked to a thermostated bath.

8. The evaporation apparatus of claim 1 wherein the at least one heating element is heated using solar energy.

9. The evaporation apparatus of claim 1 wherein the evaporator means and the storage means comprise plastic components.

10. The evaporation apparatus of claim 1 wherein said apparatus is used to purify liquids.

11. The evaporation apparatus of claim 1 wherein said apparatus is used for reclamation of a substance for a water-substance mixture.

12. The evaporation apparatus of claim 11 wherein said substance is glycol.

13. The evaporation apparatus of claim 11 wherein the substance is a colloid.

14. The evaporation apparatus of claim 1 wherein the at least one heating element is heated using solar energy.

15. An evaporation method comprising:
    (a) providing an evaporation apparatus, said evaporation apparatus comprising:
        (i) an evaporator means for evaporating a liquid, said liquid defining in the evaporator means a surface area, the surface area defining a liquid-gas interface, said evaporator means including at least one heating element; and
        (ii) a displacement means for displacing vapor created by the evaporator means;
        (iii) a storage system for storing said liquid to be evaporated, the storage system being operable for maintaining said liquid in said evaporator means such that said at least one heating element is in contact with said liquid-gas interface;
    (b) passing said liquid through said evaporator means such that said liquid-gas interface is in contact with said at least one heating element;
    (c) activating said at least one heating element to thereby heat and evaporate said liquid by thermocapillary convection;
    (d) displacing vapor produced by said evaporator means using said displacement means;
    (e) maintaining a level of said liquid in said evaporator means such that said liquid-gas interface is in contact with said at least one heating element.

* * * * *